(12) United States Patent
Jones et al.

(10) Patent No.: US 8,839,271 B2
(45) Date of Patent: Sep. 16, 2014

(54) CALL STACK SAMPLING TO OBTAIN INFORMATION FOR ANALYZING IDLE STATES IN A DATA PROCESSING SYSTEM

(75) Inventors: Scott Thomas Jones, Austin, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2486 days.

(21) Appl. No.: 11/548,520

(22) Filed: Oct. 11, 2006

(65) Prior Publication Data

US 2008/0148240 A1  Jun. 19, 2008

(51) Int. Cl.
*G06F 9/54* (2006.01)
*G06F 11/36* (2006.01)
(52) U.S. Cl.
CPC .................................. *G06F 11/3612* (2013.01)
USPC .......................................................... 719/318
(58) Field of Classification Search
None
See application file for complete search history.

(56) References Cited

U.S. PATENT DOCUMENTS

| | | | |
|---|---|---|---|
| 5,752,031 A | 5/1998 | Cutler et al. | |
| 6,477,561 B1 | 11/2002 | Robsman | |
| 6,823,515 B2 | 11/2004 | LiVecchi | |
| 7,398,518 B2 * | 7/2008 | Dichter | 717/127 |
| 2002/0007387 A1 | 1/2002 | Ginsberg | |
| 2005/0086359 A1 | 4/2005 | Banerjee et al. | |
| 2005/0229176 A1 | 10/2005 | Findeisen | |

FOREIGN PATENT DOCUMENTS

GB   2367642 A * 4/2002

\* cited by examiner

*Primary Examiner* — H S Sough
*Assistant Examiner* — Syed Roni
(74) *Attorney, Agent, or Firm* — Yee & Associates, P.C.; Parashos Kalaitzis

(57) ABSTRACT

A computer implemented method, apparatus, and computer usable program code for sampling call stack information. Monitoring for an event is performed during an execution of a plurality of threads by a set of processors. A portion of the plurality of threads is identified based on a policy to form a set of identified threads in response to an occurrence of the event. Call stack information is collected for the set of identified threads using an under utilized processor in a set of processors in response to identifying the portion of the plurality of threads, wherein the call stack information is used to profile a processor in the set of processors.

20 Claims, 5 Drawing Sheets

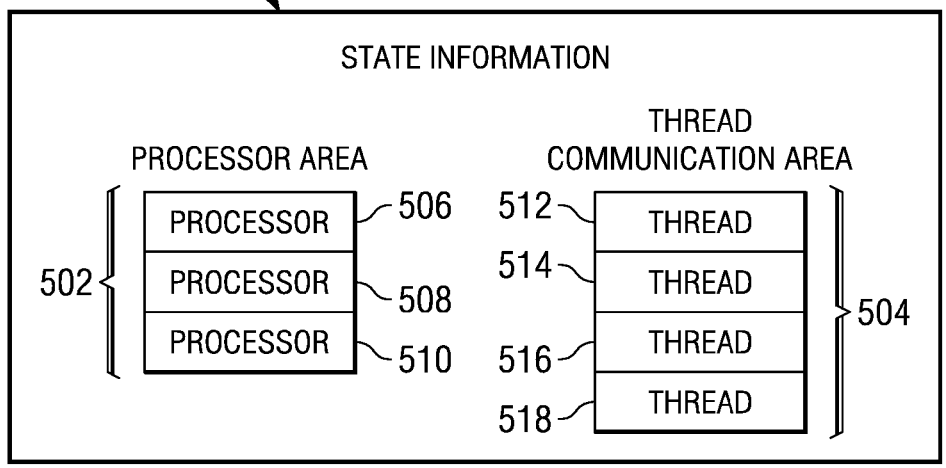
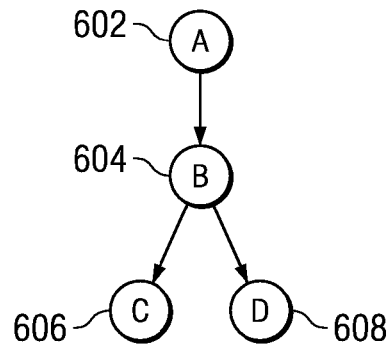
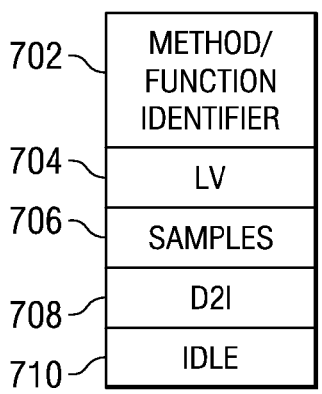

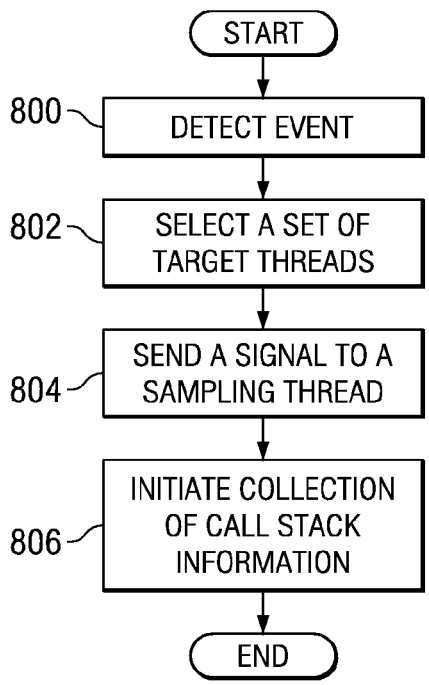
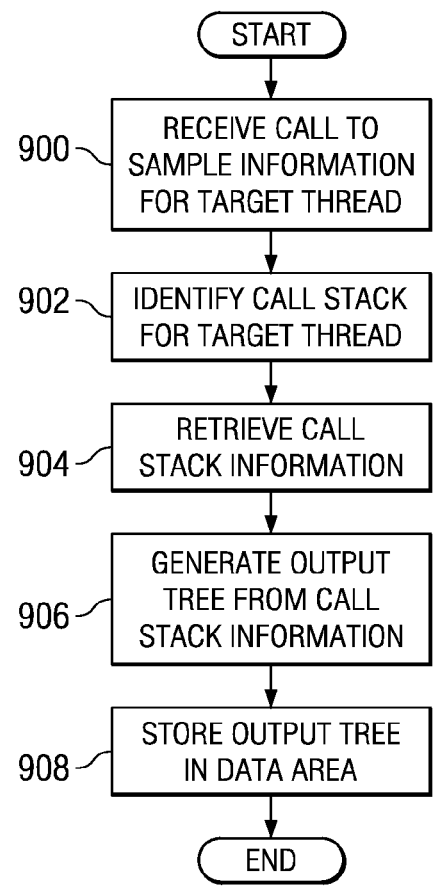
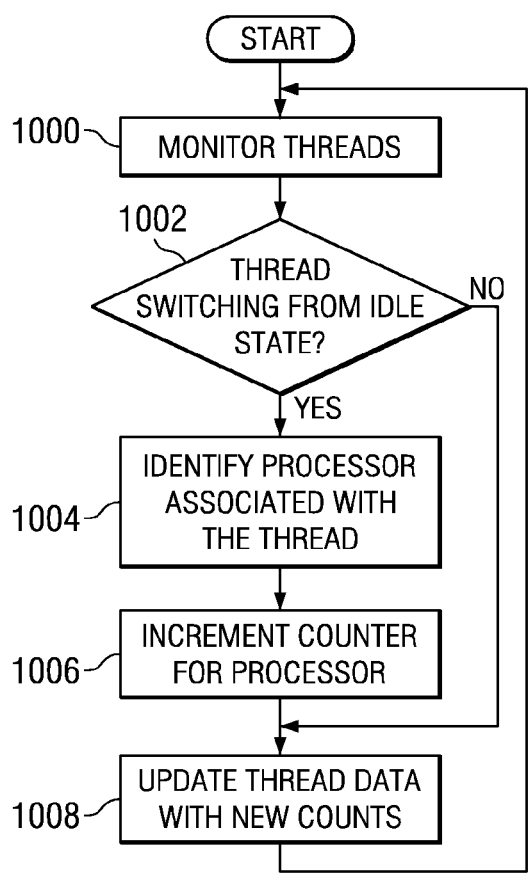

CALL STACK SAMPLING TO OBTAIN INFORMATION FOR ANALYZING IDLE STATES IN A DATA PROCESSING SYSTEM

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for obtaining data for use in analyzing idle states in a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may be used using various techniques to provide information, such as execution flows as well as other aspects of an executing program. A trace may contain data about the execution of code. For example, a trace may contain trace records about events generated during the execution of the code. A trace also may include information, such as, a process identifier, a thread identifier, and a program counter. Information in the trace may vary depending on the particular profile or analysis that is to be performed. A record is a unit of information relating to an event that is detected during the execution of the code.

One part of analyzing the performance of a system involves identifying the reasons that a processor is busy or idle. In a symmetric multi-processor system, an inability to adjust a workload to keep all of the processors busy limits the scalability of the system. Complex applications, such as Web servers and other E-Commerce applications require an understanding as to why these applications are not fully utilizing the available processor cycles.

Information useful in identifying reasons that a processor is busy or idle includes information from call stacks for the different threads that are being executed in a multi-processor system. Current techniques for obtaining this information involve waking a process periodically to obtain all of the threads present and determine the status of these threads.

It would be advantageous to have an improved computer implemented method, apparatus, and computer usable program code for obtaining call stack information from threads.

SUMMARY OF THE INVENTION

The present invention provides a computer implemented method, apparatus, and computer usable program code for sampling call stack information. Monitoring for an event is performed during an execution of threads by a set of processors. A portion of the threads is identified based on a policy to form a set of identified threads in response to an occurrence of the event. Call stack information is collected for the set of identified threads using an under utilized processor in a set of processors in response to identifying the portion of the plurality of threads, wherein the call stack information is used to profile a processor in the set of processors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating state information in accordance with an illustrative embodiment;

FIG. 6 is a diagram of a tree in accordance with an illustrative embodiment;

FIG. 7 is a diagram illustrating information in a node in accordance with an illustrative embodiment;

FIG. 8 is a flowchart of a process in a device driver for collecting call stack information in accordance with an illustrative embodiment;

FIG. 9 is a flowchart of a process in a thread for collecting call stack information in accordance with an illustrative embodiment;

FIG. 10 is a flowchart of a process for incrementing counters for threads in an idle state in accordance with an illustrative embodiment.

DETAILED DESCRIPTION OF THE PREFERRED EMBODIMENT

Figure 1:
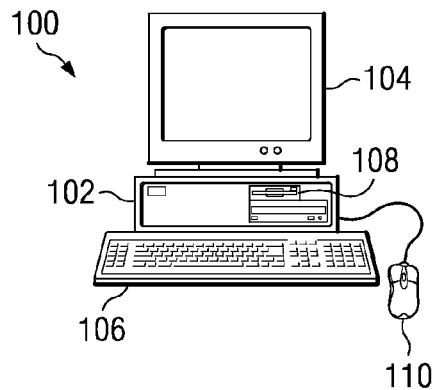
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
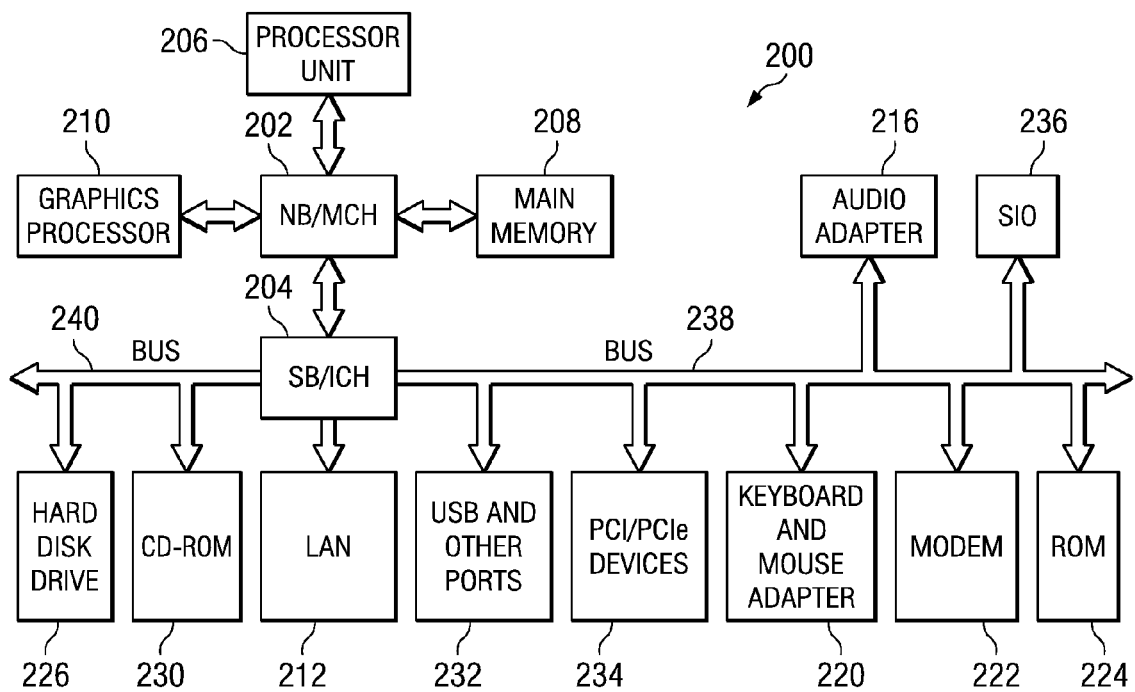
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The different embodiments realize that the current mechanisms for sampling threads are performed periodically and that all of the threads are obtained and the status of those threads is determined. The call stacks are then obtained for threads that meet some specified criteria. These currently used mechanisms do not distinguish between cases when a high usage of processor resources is present and when a low usage of processors resources is present. An example of a low usage of processor resources is a presence of one or more under utilized processors. A high usage of processor resources occurs, for example, when all of the processors are executing threads. Collecting information during this type of processor usage may slow down the system or result in inaccurate information as to actual processor usage by currently running processes and threads.

Thus, the illustrative embodiments provide a computer implemented method, apparatus, and computer usable program code for sampling call stack information. These embodiments take into account processor usage in obtaining call stack information.

An event is monitored during an execution of threads by a set of processors. The set of processors is a set of one or more processors. In response to an occurrence of an event, a portion of the threads are identified based on a policy. This portion of the threads may be one thread or multiple threads. Call stack information is collected for the identified threads using an under utilized processor.

In these examples, an under utilized processor is an idle processor or a processor having the lowest usage it an idle processor is not present in the set of processors. Typically, the different embodiments will wait for a processor to become idle before initiating the collection of call stack information. This call stack information is used to profile threads. The profile may be used to determine why a bottleneck may occur with a certain processor while other processors remain under utilized. In other words, this information may be used to understand why applications do not fully utilize available processor cycles.

In inspecting idle threads, the total accumulated idle time that a thread has been in an idle mode for a specific period of time may be identified. Further, a determination may be made as to whether the thread was idle as a result of a first and a second event, such as, for example, why a direct memory access (DMA) transfer was in progress while the processor was idle. The different statistics also include the number of idles that occur by processor and by all the processors in a set of processors in which the information may be updated when the threads are dispatched. For example, for each inspected thread, a determination may be made as to the amount of time that the processor or processors were idle since the thread was last dispatched and if the amount of time is over the specified threshold, the thread may be selected for further examination and processing using the different embodiments.

Figure 3:
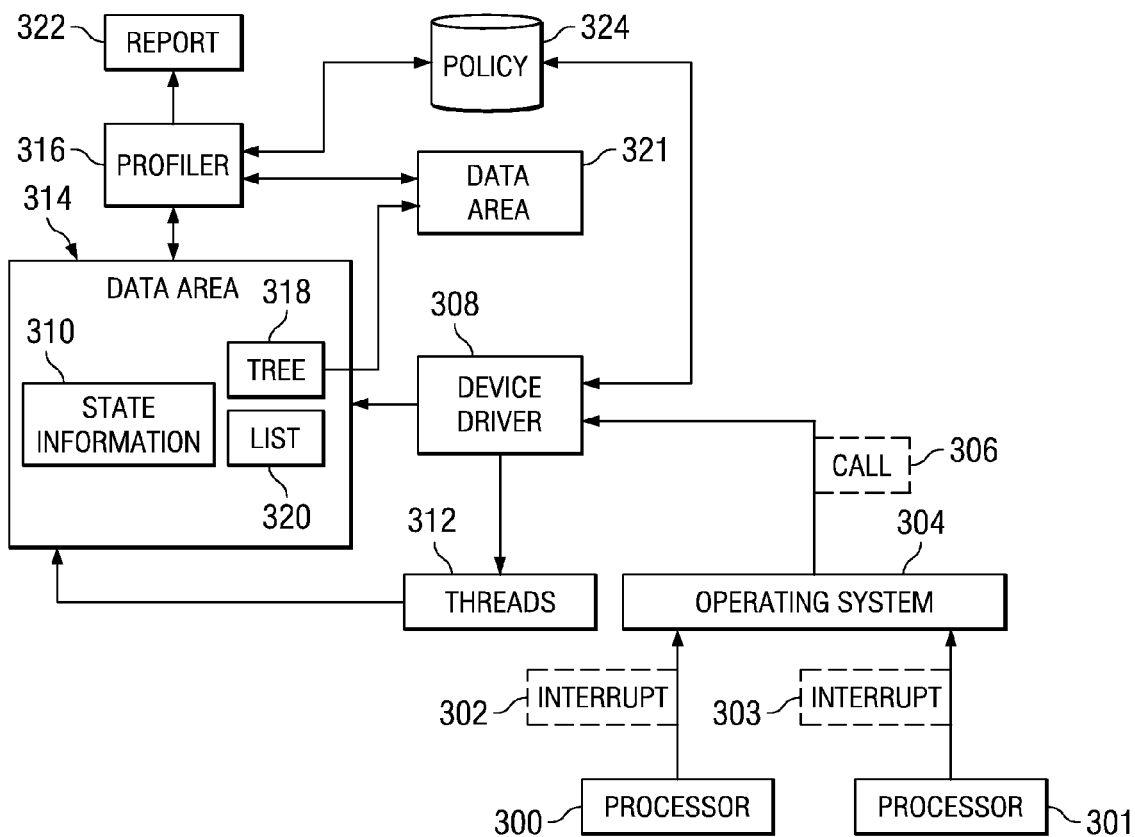
FIG. 3 is a diagram illustrating components used to identify idle states during processing in accordance with an illustrative embodiment.

Turning now to FIG. 3, a diagram illustrating components used to identify idle states during processing is depicted in accordance with an illustrative embodiment. In this depicted example, the components are examples of hardware and software components found in a data processing system, such as data processing system 200 in FIG. 2.

Processor 300 generates interrupt 302, which may result in call 306. Processor 301 may generate interrupt 303, which may result in call 306. Call 306 is identified and processed by device driver 308. In these examples, call 306 is generated by a presently used operating system dispatcher located in operating system 304. This dispatcher is hooked or modified to generate a call or a branch to device driver 308 when an event of interest occurs. A thread may explicitly wait. In other words, the thread may relinquish control without an interrupt being processed and cause the dispatcher to get control and make the call 306 to the device driver.

When call 306 is received from operating system 304, device driver 308 determines whether the dispatch is directed towards an idle processor thread or to a processor thread that is not idle in threads 312. Device driver 308 updates state information for processor 300, and performs operations, such as accumulating counts and may write trace records. Device driver 308 saves state information 310 in data area 314 and returns control back to the dispatch routine within operating system 304.

Device driver 308 receives call 306 through hooks in these examples. A hook is a break point or callout that is used to call or transfer control to a routine or function for additional processing, such as determining idleness occurring during execution in these examples.

In these illustrative examples, device driver 308 increments counters for processors in which idle states occur to indicate the number of times a processor is idle during execution in state information 310. Device driver 308 writes counts in state information 310, which is accessible by profiler 316. Device driver 308 writes or increments a counter each time the idle thread is dispatched, at either the entry from the dispatch to the idle thread or the exit from the idle thread to the dispatch, and copies or accumulates this information for a thread into state information 310 in data area 314, which is accessible by the thread.

In these illustrative examples, state information 310 includes a count of the number of times that the operating system has dispatched to or from the idle thread. The counts are made on a per-processor basis in these examples. Additionally, an overall count for all the processors also may be maintained. These counts are maintained by device driver 308 in these examples. This information may be collected by profiler 316 to generate report 322 regarding idle states of processor 300. Profiler 316 may access data area 314 to process information and record information in tree 318.

For example, when device driver 308 receives call 306 and determines that a sample should be taken, device driver 308 sends a signal to a sampling thread within threads 312 to collect call stack information for one or more threads of interest within threads 312. These threads may be identified through list 320. In a preferred embodiment, tree 318 is created within in a separate data area different from data area 314, such as data area 321. Tree 318 contains call stack information, and may also include additional information about the leaf node. This additional information identifies the method that was active when the thread becomes idle, such as, how long one or more processors have been idle. The leaf node may also contain a count as to how many times a particular processor has been idle.

Profiler 316 is an application that is sample based. Profiler 316 selects threads from which sampling is to occur. The threads are selected using list 320. In these examples, list 320 is a list of threads of interest for which call stack information may be collected. List 320 is located in data area 314 and may be particular threads registered by profiler 316 in these examples. Alternatively, threads for which call stack information is collected may be based on other criteria. For example, a rule may indicate that all blocked threads or all suspended threads are threads for which call stack information is to be collected when call 306 occurs.

Policy 324 contains a set of rules may be used to determine what threads are threads of interest. Profiler 316 may identify threads of interest through policy 324 and register those threads by placing them within list 320. In a preferred embodiment, device driver 308 may use policy 324 to identify threads of interest depending on the particular implementation. This determination may be based on information available to the device driver, such as, how long a thread has been idle while a processor is idle.

A count of the number of times that the thread for a processor has gone into an idle state is accumulated in a current node. The current node is the node that was last executing when the dispatcher stopped executing the thread and dispatched either another thread or an idle thread. When the sample is taken, the new idle count is identified. The difference between the base of current idle count and the new idle count is accumulated in the current leaf node for the thread in tree 318. In addition to the number of times that a thread or processor has been in an idle state, tree 318 also may contain information identifying how long the processor or thread has been in an idle state.

Illustrative embodiments are applied to multi-processor systems in which two or more processors are present. In these types of systems, a counter may be assigned to each processor as well as a counter for the overall number of times that idle states have occurred in all of the processors within the data processing system.

In the different embodiments, tree 318 is generated using call stack information obtained regarding threads of interest. In these illustrative examples, a thread of interest is identified by profiler 316 using policy 324. Policy 324 is a set of rules used to identify one or more threads for which call stack information is desired. The call stack information for the thread is obtained and processed to create tree 318 using an under utilized processor. For example, if processor 301 is idle when the call stack information is to be obtained, this processor may be woken up and used to obtain the call stack information and process that information to generate tree 318.

If both processor 300 and processor 301 are being used, the different embodiments may wait for one of the processors to become idle. Alternatively, the processor having the least amount of work or usage of processor cycles may be selected to generate the information. By dispatching a sampling thread to obtain call stack information, an operating system normally dispatches the thread to an idle processor. As a result, special processes and mechanisms are not needed to identify an idle processor. Depending on the particular implementation, a process or code may be used to identify or wait for a processor to become idle without using current operating system mechanisms for dispatching threads.

In these illustrative examples, profiler 316 may send a process identifier to device driver 308 to identify a particular process that is to be monitored. When call 306 is received as a result of an interrupt or a dispatch of a thread, device driver 308 may initiate collection of call stack information for one or more threads within threads 312 by signaling the profiler.

In the case of an interrupt, the interrupt handler may make a determination that the idle thread was running and initiate a Deferred Procedure Call (DPC) or a second level interrupt handler to signal the profiler. In these examples, the event may be each time a thread is dispatched to idle. Of course, other events also may be used to initiate collection of the information. For example, the information may be generated periodically in response to and expiration of a timer.

Further, the initiation of call stack information may be collected when a particular thread of interest goes to idle, rather than every time a thread goes to an idle state. In this type of embodiment, call 306 is examined to identify which particular thread is being dispatched to idle. As a result, device driver 308 may use a policy to determine whether call stack information should be collected for that particular thread. Further, the collection of call stack information also may be based on a particular processor that is idle, rather than a thread being dispatched.

Figure 4:
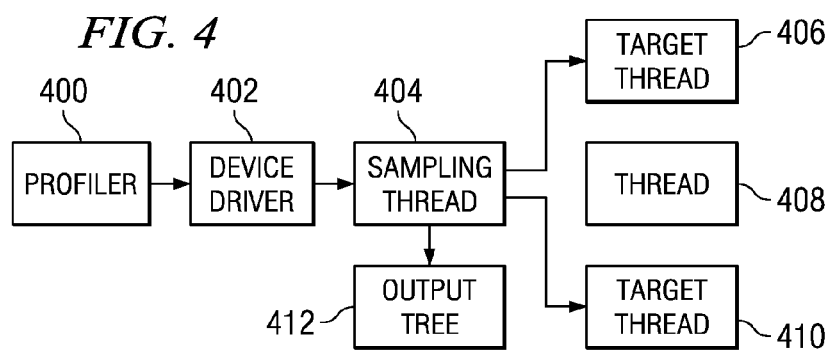
FIG. 4 is a diagram illustrating components used to obtain call stack information for analysis in accordance with an illustrative embodiment.

With reference to FIG. 4, a diagram illustrating components used to obtain call stack information for analysis is depicted in accordance with an illustrative embodiment. In this example, the components include profiler 400, device driver 402, sampling thread 404, target thread 406, thread 408, target thread 410, and output tree 412. Device driver 402 identifies threads of interest based on idle information and signals profiler 400 to examine the specified thread. Profiler 400 is similar to profiler 316 in FIG. 3, and device driver 402 is similar to device driver 308 in FIG. 3. The mechanism illustrated in FIG. 4 is a sampling mechanism in which a sampling thread, such as sampling thread 404 is dispatched to obtain information on a target thread, such as target thread 406 or target thread 410.

When profiler 400 receives control, profiler 400 may also have an additional policy that further reduces the threads for which call stacks are retrieved. By using the Java™ virtual machine Tool Interface (JVMTI), profiler 400 may get information about the threads of interest. In order to do this, the Java™ virtual machine provides a mechanism to map native threads to Java™ thread IDs or alternatively, to allow profiler 400 to map Java™ thread IDs to native thread IDs. This type of support may be done at the time Java™ virtual machine threads are created.

This particular diagram shows more detail of the threads, in threads 312 in FIG. 3, involved in obtaining call stack information for analysis. Sampling thread 404 is a thread generated by profiler 400. Sampling thread 404 is used to obtain call stack information for one or more target threads. Sampling thread 404 may be assigned to a particular processor. Alternatively, sampling thread 404 may be assigned to more than one processor. Further, sampling thread 404 may be permanently assigned or assigned to a processor when call stack information is needed.

In these examples, the target threads are target thread 406 and target thread 410. These threads are registered as threads of interest by device driver 402. The threads of interest may be placed into a list, such as list 320 in FIG. 3. This list is used by profiler 400 to qualify which threads are candidates for sampling. As depicted, thread 408 is not a thread of interest and is not sampled when an event occurs. Alternatively, a target thread may be identified through a policy, such as policy 324 in FIG. 3. The thread to be sampled may be targeted by dispatching a sampling thread associated with the target thread. As another alternative, the sampling thread may be given an identification of the target that is to be sampled.

When a call occurs indicating that a thread of interest, such as target thread 406 or 410 has gone to idle, device driver 402 sends a signal to sampling thread 404 to obtain call information on the target thread that has gone to idle. Sampling thread 404 wakes up and identifies a set of target threads for sampling. This set of target threads contains one or more threads and may be found in a list, such as 320 within data area 314 in FIG. 3.

In response, sampling thread 404 is dispatched to perform this process on a processor that is idle. Depending on the implementation, sampling thread 404 may only obtain call information for a single target thread or may obtain call information for multiple target threads. Further, when a thread goes to idle, sampling thread 404 may only sample the thread that has gone to idle or sampling thread 404 may sample call stacks for all threads that have been registered by profiler 400.

In these examples, the threads that have been identified by device driver 402 are maintained in a list, such as list 320 in FIG. 3. Sampling thread 404 then retrieves the list and calls the Java™ virtual machine to retrieve call stack information for the threads of interest and to generate output tree 412. Output tree 412 is an example of tree 318 in FIG. 3. For each sample taken, profiler 400 places the retrieved call stack for the thread into a call stack tree and updates base counts for the leaf node of the tree for those metrics, which are available and are monitored by profiler 400.

Also, depending on the particular implementation, additional criteria in addition to a thread being dispatched to idle may be required by the policy before obtaining call stack information for threads of interest. For example, in addition to a thread being dispatched to idle, a determination may be made as to whether any of the threads of interest are blocked threads. In other words, a determination is made as to whether target thread 406 or 410 is blocked when a dispatch of a thread to idle occurs.

With the type of implementation, the thread being dispatched to idle may not be one of the threads registered as a thread of interest as it may not belong to the process registered with profiler 400 with device driver 402. Profiler 400 may further qualify which threads call stacks are to be obtained by using additional information available from the Java™ virtual machine.

Turning to FIG. 5, a diagram illustrating state information is depicted in accordance with an illustrative embodiment. In this example, state information 500 is an example of state information 310 in FIG. 3. State information 500 contains processor area 502 and thread communication area 504.

In this example, process area 502 contains the number of idle dispatches for each processor. As depicted, process area 502 contains idle dispatch information for processors 506, 508, and 510. Thread communication area 504 contains information for individual threads. The information in thread communication area 504 may be accessed by the application and by the device driver. This area could be, for example, shared memory or specific requests to read or write to the area. In this example, thread communication area 504 contains state information for threads 512, 514, 516, and 518.

Each of these sections in thread communication area 504 contains information that may include any or all of the following: an identification of the processor last dispatched, the number of idle dispatches on that processor at the time that the thread was last dispatched, the total number of idle dispatches on all processors at the time the thread was dispatched, the total number of dispatches while on any specific processor, the total amount of time that a processor has been in an idle state, and the total amount of time that a thread has been in an idle state.

As described above, this information is obtained by a device driver dispatching a sampling thread to sample information for one or more target threads. One advantage of using a sampling thread is that the dispatching of the sampling thread uses the operating system process for dispatching threads to processors. This process involves the operating system sending the sampling thread to be executed by a processor in an idle state. As a result, special modifications or processes are not needed to ensure that the sampling thread is executed on an idle processor. In these examples, the device driver sends a signal to the sampling thread to wake up the sampling thread. The sampling thread looks in a shared data area, such as data area 314 in FIG. 3 to identify a list of threads that should be sampled.

A call tree is constructed by getting the call stack from the Java™ virtual machine at the time of a sample. The call tree may be constructed by monitoring method/functions entries and exits. In these examples, however, call tree 600 in FIG. 6 is generated using samples obtained by a sampling thread, such as sampling thread 404 in FIG. 4.

This call tree can be stored as tree 318 in FIG. 3 or as a separate file that can be merged in by profiler 316 in FIG. 3. Profiler 316 in FIG. 3 can use this call tree to provide the application's path as it goes into an idle state.

Turning to FIG. 6, a diagram of a tree is depicted in accordance with an illustrative embodiment. Tree 600 is a call tree and is an example of tree 318 in FIG. 3. Tree 600 is accessed and modified by an application, such as profiler 316 in FIG. 3. In this example, tree 600 contains nodes 602, 604, 606, and 608. Node 602 represents an entry into method A, node 604 represents an entry into method B, and nodes 606 and 608 represent entries into method C and D respectively.

Turning now to FIG. 7, a diagram illustrating information in a node is depicted in accordance with an illustrative embodiment. Entry 700 is an example of information in a node, such as node 602 in FIG. 6. In this example, entry 700 contains method/function identifier 702, tree level (LV) 704, samples 706, Dispatches to idle (D2I) 708 for a processor, and idle 700.

The information within entry 700 is information that may be generated for a node within a tree. For example, method/function identifier 702 contains the name of the method or function. Tree level (LV) 704 identifies the tree level of the particular node within the tree. For example, with reference back to FIG. 6, if entry 700 is for node 602 in FIG. 6, tree level 704 would indicate that this node is a root node.

When the profiler is signaled, the profiler requests that a call stack be retrieved for each thread of interest. Each call stack that is retrieved is walked into a call stack tree and each of the changes to metrics that are provided by the device driver are added to the leaf node's base metrics.

Base metrics may include idle 710, which identifies the total number of times that any processor was idle while the method was executing as well as how long a processor has been idle. Idle 710 is for all processors and includes accumulated delta time since thread was last dispatched, accumulated delta time spent in idle thread for processor, accumulated delta time spent in idle threads for all processors. Each idle metric in idle 710 has a separate count in a node. Thus, separate numbers are present for each of the items that are counted and accumulated as base metrics.

Dispatches to idle (D2I) 708 consists of the number of dispatches to idle on the same processor as the method was last running. Other counts and approaches could be used, for example, count only dispatches from the thread to idle, or count only dispatches from idle to the thread.

Turning now to FIG. 8, a flowchart of a process in a device driver for collecting call stack information is depicted in accordance with an illustrative embodiment. The process illustrated in FIG. 8 may be implemented in a device driver, such as device driver 402 in FIG. 4 or device driver 308 in FIG. 3.

The process begins by detecting an event (step 800). A set of target threads is selected (step 802). The device driver may use a policy to determine what threads are target threads. For example, a policy may include a rule to obtain call stack information for all blocked threads or all suspended threads or all threads that have been suspended while one or more processors are idle. Next, a signal is sent to a sampling thread (step 804). The sampling thread may be assigned to a particular processor to collect information for one or more target threads.

The signal is sent to the sampling thread to activate the sampling thread or dispatch it from an idle mode. Finally, collection of call stack information is initiated (step 806) with the process terminating thereafter. In step 806, the device driver tells the sampling thread the identity of the target thread for which call stack information is to be collected.

Turning next to FIG. 9, a flowchart of a process in a thread for collecting call stack information is depicted in accordance with an illustrative embodiment. The process illustrated in FIG. 9 may be implemented in a thread, such as sampling thread 404 in FIG. 4.

The process begins by receiving a call to sample information for a target thread (step 900). The call stack for the target thread is identified (step 902). Call stack information is then retrieved to form a sample (step 904). Next, an output tree is generated from the call stack information (step 906). Tree 600 in FIG. 6 is an example of an output tree that may be generated by the sampling thread. Finally, the output tree is stored in a data area (step 908) with the process terminating thereafter. In these examples, the tree is stored in a data area, such as data area 314 in FIG. 3.

Turning to FIG. 10, a flowchart of a processor for incrementing counters for threads in an idle state is depicted in accordance with an illustrative embodiment. The process illustrated in FIG. 10 may be implemented in a device driver, such as device driver 308 in FIG. 3.

The process begins by monitoring threads (step 1000). A determination is made as to whether a thread is switching from an idle state (step 1002). This determination may be made by a device driver in response to dispatches occurring during execution of code by a processor. Next, the processor associated with the thread is identified (step 1004). The process then increments the counter for the identified processor (step 1006). The process then proceeds to update the thread data area with idle counts (step 1008). These idle counts may include the specific processor idle counts or idle counts for all processors or any other idle count as described in this application. Then, the process proceeds to step 1000 as described above. Step 1008 is described in more detail in the description of FIG. 11 below.

With reference again to step 1002, if the thread is not switching from an idle state the process proceeds to step 1008 as described above.

Figure 11:
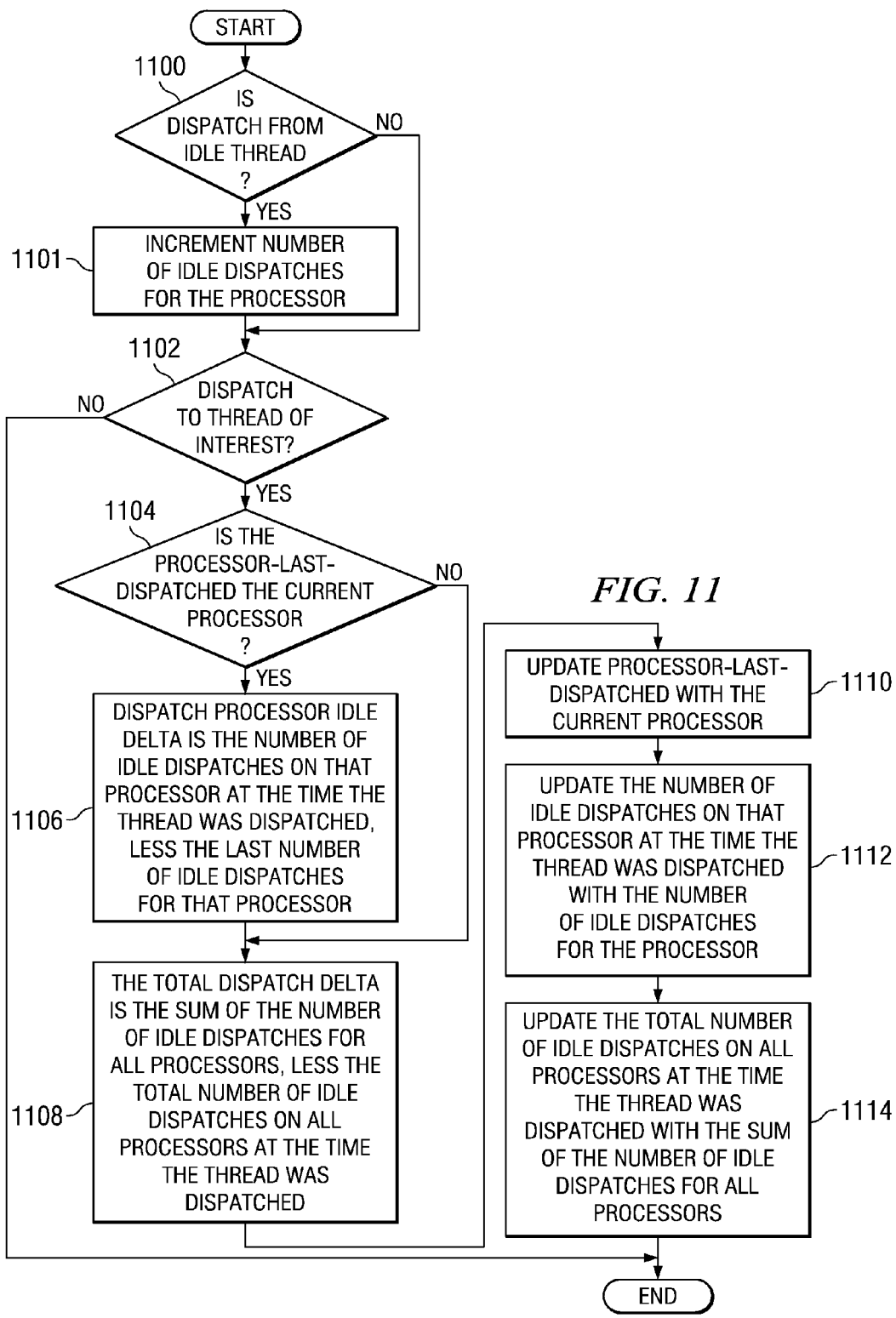
FIG. 11 is a flowchart of a process for handling dispatching from an idle thread in accordance with an illustrative embodiment.

With reference now to FIG. 11, a flowchart of a process for handling dispatching from an idle thread is depicted in accordance with an illustrative. The process illustrated in FIG. 11 may be implemented in a device driver, such as device driver 308 in FIG. 3 or device driver 402 in FIG. 4. In particular, FIG. 11 is a more detailed description of step 1008 in FIG. 10. This figure describes a single dispatch in these examples.

The process begins when a thread is dispatched and a determination is made if the dispatch is from idle (step 1100). If the dispatch is from idle, then the process continues by incrementing the number of idle dispatches for the processor (step 1101). In any case, the process continues by making a determination as to whether the dispatch is to a thread of interest (step 1102). The thread of interest may be any thread or a thread in a process that has been identified for monitoring.

If the dispatch is not to a thread of interest in step 1102, the process terminates. Otherwise, a determination is made as to whether the thread of interest was last dispatched to the current processor (step 1104).

If the thread of interest was last dispatched to the current processor, the dispatch processor's idle delta is set equal to the new number of idle dispatches on that processor at the time the thread was dispatched minus the last number of idle dispatches for the processor (step 1106). The last processor dispatched and the last number of idle dispatches for the processor is available in the thread work area. The new number of idle dispatches on that processor are in the per-processor work area. The change of values are placed or accumulated in the thread work area.

If the last processor dispatched is not the current processor as specified in the thread work area, then in a preferred embodiment, the difference between the current value of the number of idle dispatches on the previous processor available in the per-processor work area and the previous number of idle dispatches on the thread available in the thread work area may be added to the total number of dispatches on processor in the thread work area. In this embodiment, the total number of dispatches on the last dispatched processor is also kept in the thread work area.

Thereafter, the total dispatch delta is set equal to the sum of the number of idle dispatches for all processors minus the total number of idle dispatches on all processors at the time thread was dispatched (step 1108). In alternative embodiment, the process proceeds directly to this step from step 1104, if the processor last dispatched is not the current processor. Next, the process updates the processor last dispatched in the thread work area with the current processor (step 1110).

Then, the number of idle dispatches on the processor at the time the thread was dispatched is updated with the number of idle dispatches for the processor (step 1112). Next, the process updates the total number of idle dispatches on all processors at the time the thread was dispatched with the sum of the number of idle dispatches for all processors (step 1114) with the process terminating thereafter. In step 1102, if the dispatch is not a thread of interest, the process also terminates.

When a monitored thread is again dispatched, the idle counts accumulated while the thread was not active are added to the metrics for the thread. When the thread is no longer active, that is, a dispatch away from the thread occurs, the last value of the metrics are saved in the thread work area. This value is saved such that a determination can be made of the accumulated value of the metrics for the thread when needed.

In an alternative embodiment, the dispatch information may be written to a trace buffer, such as, Event Tracing for Windows (ETW) and this trace buffer may be processed to determine idle time. When an interrupt occurs and a processor is idle, the information from the trace buffer may be used to identify the threads that meet the idle criteria. When the profiler is signaled, it may take the counts provided by the device driver and add them to the base entries of the leaf nodes for those threads for which call stacks are retrieved.

Thus, the different embodiments provide a computer implemented method, apparatus, and computer usable program code for sampling call stack information. An event is monitored during an execution of threads by a set of processors. The set of processors is a set of one or more processors. In response to an occurrence of an event, a portion of the threads are identified based on a policy. This portion of the threads may be one thread or multiple threads. Call stack information is collected for the identified threads using an under utilized processor. This call stack information is used to profile a processor in the set of processors.

By using an under utilized processor, such as a processor in an idle state, the different illustrative embodiments collect and process data with minimal or no impact on other executing threads. In the illustrative embodiments, call stack information is collected using a sampling thread that belongs to the profiler. This sampling thread places the collected call stack information into a tree and stores that tree in a memory location, such as a data area for use by an application to analyze performance of the processor. In these examples, the identified thread may be, for example, each thread associated with the processor entering an idle state, each thread is blocked from running or executing, or each thread found in a list of threads. Of course, the particular target threads for which call stack information is collected may be specified using numerous other criteria depending on the particular implementation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sampling call stack information, the computer implemented method comprising:
    monitoring for an idle event during an execution of a plurality of threads by a set of processors;
    responsive to an occurrence of the idle event, identifying portion of the plurality of threads based on a policy to form a set of identified threads; and
    signaling a profiler to collect call stack information for at least one thread in the set of identified threads, in response to the signaling.

2. The computer implemented method of claim 1 further comprising:
    collecting the call stack information in response to signaling the profiler using a sampling thread executing on an under utilized processor to form collected call stack information, wherein the under utilized processor is one of (i) an idle processor and (ii) a processor having the lowest usage from amongst the set of processors if an idle processor is not present;
    placing the collected call stack information into a tree; and
    storing the tree in a memory location.

3. The computer implemented method of claim 1, wherein the identifying step comprises:
    identifying each thread associated with a processor entering an idle state.

4. The computer implemented method of claim 1, wherein the identifying step comprises:
    identifying each thread that is blocked from running.

5. The computer implemented method of claim 1, wherein the identifying step comprises:
    identifying each thread in the plurality of threads found on a list of threads.

6. The computer implemented method of claim 1, wherein the event is at least one of an interrupt, an expiration of a timer, an indication that a thread is going into an idle state, and an indication that the processor is going into an idle state.

7. The computer implemented method of claim 1 further comprising:
    analyzing the call stack information to profile a processor.

8. The computer implemented method of claim 1, wherein the monitoring step is performed by a device driver and wherein the collecting step is performed by a sampling thread.

9. The computer implemented method of claim 1, wherein the monitoring step is performed by processing a trace log and an interrupt taken that indicated that a processor is idle.

10. A computer implemented method for sampling call stack information, the computer implemented method comprising:
    monitoring for an idle event during execution of a plurality of threads in a virtual machine, wherein the idle event occurs when a given thread of the plurality of threads has been in an idle mode for at least a specific time period;
    responsive to an occurrence of the idle event, dispatching a sampling thread associated with a profiler to an idle processor; and
    collecting the call stack information from a portion of the plurality of threads using the sampling thread, wherein the potion of the plurality of threads is identified using a policy.

11. A computer program product comprising:
    a computer usable storage medium having computer usable program code stored thereon for sampling call stack information, the computer program medium comprising:
    computer usable program code for monitoring for an idle event during an execution of a plurality of threads by a set of processors;
    computer usable program code, responsive to an occurrence of the idle event, for identifying a portion of the plurality of threads based on a policy to form a set of identified threads; and
    computer usable program code for signaling a profiler to collect call stack information for at least one thread in the set of identified threads, in response to the signaling.

12. The computer program product of claim 11 further comprising:
    computer usable program code for collecting the call stack information in response to signaling the profiler using a sampling thread executing on an under utilized processor to form collected call stack information, wherein the under utilized processor is one of (i) an idle processor and (ii) a processor having the lowest usage from amongst the set of processors if an idle processor is not present;
    computer usable program code for placing the collected call stack information into a tree; and
    computer usable program code for storing the tree in a memory location.

13. The computer program product of claim 11, wherein the computer usable program code, responsive to an occurrence of the idle event, for identifying a portion of the plurality of threads based on a policy to form a set of identified threads comprises:
    computer usable program code for identifying each thread associated with a processor entering an idle state.

14. The computer program product of claim 11, wherein the computer usable program code, responsive to an occurrence of the idle event, for identifying a portion of the plurality of threads based on a policy to form a set of identified threads comprises:
    computer usable program code for identifying each thread that is blocked from running.

15. The computer program product of claim 11, wherein the computer usable program code, responsive to an occurrence of the event, for identifying a portion of the plurality of threads based on a policy to form a set of identified threads comprises:
- computer usable program code for identifying each thread in the plurality of threads found in a list of threads.

16. The computer program product of claim 11, wherein the event is at least one of an interrupt, an expiration of a timer, an indication that a thread is going into an idle state, and an indication that the processor is going into an idle state.

17. The computer program product of claim 11 further comprising:
- computer usable program code for analyzing the call stack information to profile the processor.

18. A data processing system comprising:
- a bus;
- a communications unit connected to the bus;
- a storage device connected to the bus, wherein the storage device includes computer usable program code; and
- a processor unit connected to the bus, wherein the processor unit executes the computer usable program code to monitor for an idle event during an execution of a plurality of threads by a set of processors; identify a portion of the plurality of threads based on a policy to form a set of identified threads in response to an occurrence of the idle event; and signal a profiler to collect call stack information for at least one thread in the set of identified threads, in response to the signaling.

19. The data processing system of claim 18, wherein the processor unit further executes the computer usable program code to collect the call stack information in response to signaling the profiler using a sampling thread executing on an under utilized processor to form collected call stack information, wherein the under utilized processor is one of (i) an idle processor and (ii) a processor having the lowest usage from amongst the set of processors if an idle processor is not present; place the collected call stack information into a tree; and store the tree in a memory location.

20. The data processing system of claim 18, wherein in executing the computer usable program code, responsive to an occurrence of the idle event, for identifying a portion of the plurality of threads based on a policy to form a set of identified threads, the processor unit executes the computer usable program code to identify each thread associated with a processor entering an idle state.

* * * * *